March 26, 1957  H. M. MORROW  2,786,664
COAL CUTTING BIT HAVING A SKEWED CUTTING FACE
Filed June 24, 1955

INVENTOR.
HARRY M. MORROW
BY Woodling & Krost
Attys

United States Patent Office 2,786,664
Patented Mar. 26, 1957

2,786,664

COAL CUTTING BIT HAVING A SKEWED CUTTING FACE

Harry M. Morrow, Navarre, Ohio, assignor to The Bowdil Company

Application June 24, 1955, Serial No. 517,797

8 Claims. (Cl. 262—33)

The invention relates in general to cutting bits and more particularly to bits having skew faces for cutting coal or other substances.

In the mining of coal or other substances, a cleft is cut in the lower level of the vein by means of a cutter bar around which revolves a power driven endless chain carrying a plurality of staggeredly arranged cutting bits constituting the subject matter of this invention. Each of the staggeredly arranged cutting bits is therefore adapted to travel in its own continuous cutting path. It might be said that this cutting path lies substantially in a first plane. The shelf formed by the cleft is subsequently broken off by means of explosives or other suitable methods. When cutting the cleft in the interest of economy and the saving of power, it is highly desirable that the cutting bits be not only strong and durable but also efficient in operation and free from drag.

An object of the invention is to provide a cutting bit having a high cutting efficiency.

Another object of the invention is to provide a coal cutting bit which has a leading edge and a trailing edge which leading edge will precede the trailing edge in engaging coal to be cut whereby the total force driving the coal cutting bit will be transmitted through the cutting bit to a smaller unit area than in ordinary cutting bits thereby producing a higher cutting force per unit area.

Another object of the invention is the provision of a cutting bit which requires a minimum of power to operate.

Another object of the invention is to provide a cutting bit having a leading edge and a trailing edge whereby the leading edge will precede the trailing edge in engaging material to be cut.

Another object of the invention is to provide a cutting bit with first and second side walls and a cutting face which lies in a plane other than a plane which is normal to a longitudinal reference plane which extends intermediate the first and second side walls.

Another object of the invention is to provide a coal cutting bit which is adapted to travel in a continuous cutting path to cut coal with a cutting face which is skewed with respect to the cutting path thereby causing one edge of the cutting bit to engage coal to be cut before the other edge engages the coal.

Another object of the invention is to provide a double-ended coal cutting bit adapted to be carried in a bit holder having first and second opposed faces which have equal but opposite slopes whereby the bit may be held in the holder by either end.

Other objects and a fuller understanding of the invention may be had by referring to the following description and claims taken in combination with the accompanying drawings in which:

Figure 1:
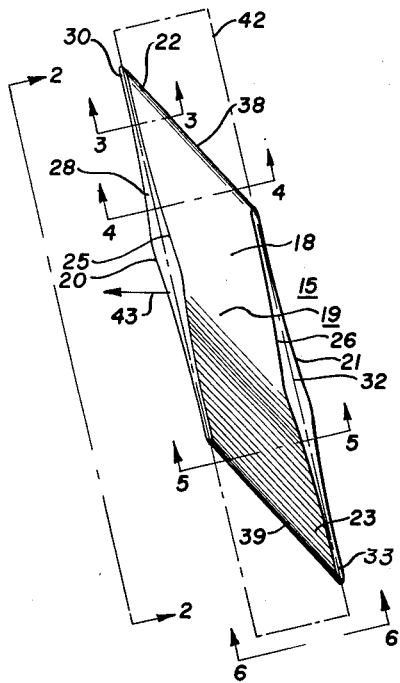
Figure 1 is a side elevational view of the cutting bit of this invention.
Figure 2:
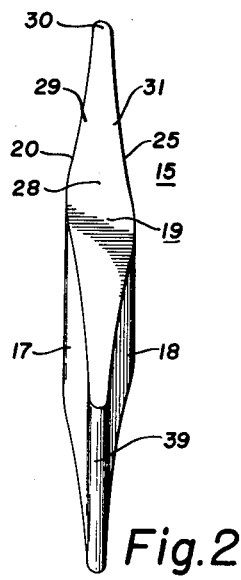
Figure 2 is a view of the cutting bit taken in a direction which is normal to the plane in which the cutting face of the cutting resides and therefore shows the true configuration of the cutting face.
Figure 4:
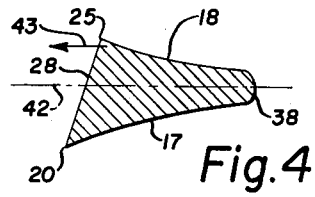
Figure 4 is a cross sectional view of the cutting bit taken along the line 4—4 of Figure 1.
Figure 5:
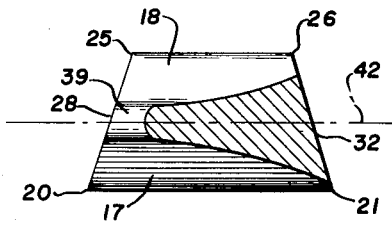
Figure 5 is a cross sectional view of the cutting bit taken along the line 5—5 of Figure 1.
Figure 6:
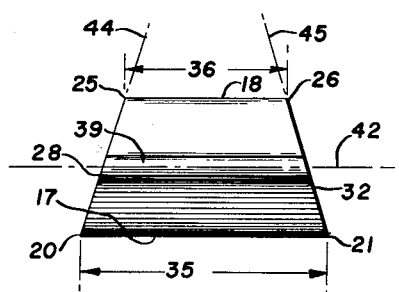
Figure 6 is an end view of the cutting bit taken along the lines 6—6 of Figure 1.

With reference to Figures 1 through 6 of the accompanying drawings a double-ended coal cutting bit 15 is shown which comprises a solid piece of metal which may be made of hardened steel in order to withstand the severe cutting operations to which it is subjected. The solid piece of metal as best seen in Figures 1 and 2 has first and second generally rhomboidal side wall means 17 and 18 respectively and a thickened central body portion 19 which narrows down to first and second end portions 22 and 23 respectively which are narrower than the central body portion 19. The double-ended bit has first and second leading edges 20 and 21 and first and second trailing edges 25 and 26. It will be noted that these side wall means are not exactly rhomboidal in shape since the leading edges 20 and 21 which make up two sides of the first rhomboidal side wall means 17 curve slightly away from each other and since the trailing edges 25 and 26 which make up two sides of the second rhomboidal side wall means 18 curve slightly toward each other as seen in Figure 1. The first leading edge 20 and the first trailing edge 25 define a first skew cutting face 28 which terminates in a first cutting point or end 30. The skew cutting face 28 has a first and second side surface portion 29 and 31 respectively. The second leading edge 21 and the second trailing edge 26 define a second skew cutting face 32 which terminates in a second cutting point or end 33. It may be said that the first and second cutting points 30 and 33 are located at the diametrically opposed sharper angles of the generally rhomboidal side wall means. As best seen in Figure 6 the first and second cutting faces 28 and 32 are non-parallel and as best seen in Figure 1 these cutting faces are offset relative to each other. The first generally rhomboidal side wall means 17 extends between and connects the first and second leading edges 20 and 21 and the second generally rhomboidal side wall means 18 extends between and connects the first and second trailing edges 25 and 26. The distance indicated by the reference numeral 35 between the leading edges 20 and 21 as measured at the thickened central body portion 19 along the first rhomboidal side wall means 17 is greater than the distance 36 between the trailing edges 25 and 26 as measured at the thickened central body portion 19 along the second rhomboidal side wall means 18. The first and second rhomboidal side wall means 17 and 18 and the first cutting face 28 converge at the first cutting point or end portion to define this cutting point and the first and second side wall means 17 and 18 and the second cutting face 33 converge at the second cutting point or end portion 33. The first and second side wall means are connected together and meet at opposed ends of the rhomboidal configuration in first and second connecting edge portions 38 and 39 respectively. The distances 35 and 36 if measured along the connecting edge portions 38 and 39, instead of along the first and second side wall means 17 and 18, will be substantially equal.

Figure 3:
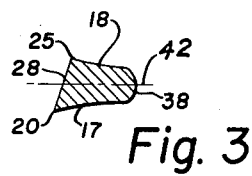
Figure 3 is a cross sectional view of the cutting bit taken along the line 3—3 of Figure 1.

A plane extending through the first connecting edge portion 38 and through the second connecting edge portion 39 would be substantially intermediate the first and second rhomboidal side wall means 17 and 18. This plane is indicated in Figures 1, 3, 4, 5 and 6 by the dot-dash lines 42 and constitutes a longitudinal reference plane. The cutting bits of this invention are removably mounted in the lugs of the endless power driven chain which revolves around the cutter bar. The holder for holding the bits of this invention might be similar to the holder which is shown in Patent No. 2,255,856 issued to H. M. Morrow on September 16, 1941 except that the surface which the skew cutting faces are to rest on while being held would have to be skewed in the same manner. When one of the cutting points of the bit wears away the bit is reversed within the same holder thus giving a double cutting life to the bits. The bits are held on the chain lugs at a slight forward angle as shown in Figure 1 and approach material to be cut generally in a direction indicated by the arrow 43 in Figures 1 and 6. As best seen in Figures 3, 4 and 5 the cutting bit of Figure 1 is of the type which has concave sides which provides a greater cutting clearance as the bit wears away. This type of bit is shown more completely in Patent No. 2,217,347 issued to H. M. Morrow on October 8, 1940. As best seen in Figure 6 the cutting face 28 lies in a plane 44 and the cutting face 32 lies in a plane 45. As seen in this view the cutting faces 28 and 32 lie in planes which are non-parallel and which are different from any plane which is normal or perpendicular to the reference plane 42. Because the cutting faces are other than normal to the reference plane 42 the cutting faces are skewed with respect to the reference plane and are also skewed with respect to the direction of travel of the cutting bit when mounted in the lugs of the endless power driven chain. As a result of this skew cutting face the leading edge 20 will precede the trailing edge 25 in engaging coal or other material to be cut. This means that the leading edge 20 will also normally precede any other portion of the cutting face in engaging material to be cut. As a result the total power which is driving the cutting bit in its cutting path will be transmitted to a smaller unit cutting area which in turn will mean that the cutting force per unit area will be greatly increased. These factors contribute to the fact that less power is required to drive this type of bit in a cutting orbit through coal or similar material and that greater efficiency of operation results.

The cutting tip portion of the coal cutting bit 15 of this invention taken from approximately the position where line 4—4 intersects the bit in Figure 1 to the cutting point 30 may be referred to as a configuration which is substantially that of a pyramid. The cutting point 30 would constitute the apex of the pyramid and Figure 4 would constitute the shape of a cross section of the pyramid. This cross section is generally triangular in shape with the first and second side wall means 17 and 18 respectively making up two sides of the triangular shape and the first skew cutting face 28 making up another side of the triangular shape.

The skew cutting face of this invention may also be applied to other types of coal cutting bits such as those shown in Patent Numbers 1,435,309; 1,902,420; 2,039,747; 2,131,188; 2,156,726; 2,168,794; 2,263,590.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A double-ended bit comprising a solid piece of metal having a thickened central body portion and narrowed first and second end portions, said piece of metal having first and second generally rhomboidal side wall means, first and second leading edges, and first and second trailing edges, said first leading and trailing edges defining a first skew cutting face terminating in a first cutting point, said second leading and trailing edges defining a second skew cutting face terminating in a second cutting point, said first and second faces having generally diamond shaped configurations, said first generally rhomboidal side wall means extending between said first and second leading edges and said second generally rhomboidal side wall means extending between said first and second trailing edges, the distance between said leading edges at said thickened central body portion measured along said first rhomboidal side wall means being greater than the distance between said trailing edges at said thickened central body portion measured along said second rhomboidal side wall means, said first and second side wall means meeting at first and second connecting edge portions respectively said first and second rhomboidal side wall means and said first cutting face converging at said first cutting point and said first and second side wall means and said second cutting face converging at said second cutting point, a plane extending through said first and second connecting edge portions and substantially intermediate said first and second generally rhomboidal side wall means constituting a longitudinal reference plane, each said first and second cutting face lying in a plane different from a plane which is normal to said reference plane.

2. A double-ended bit comprising a piece of metal having first and second substantially rhomboidal side wall means, first and second leading edges, and first and second trailing edges, said first leading and trailing edges defining a first skew cutting face terminating in a first cutting end portion, said second leading and trailing edges defining a second skew cutting face terminating in a second cutting end portion, said first substantially rhomboidal side wall means extending between said first and second leading edges and said second substantially rhomboidal side wall means extending between said first and second trailing edges, the distance between said leading edges along said first rhomboidal side wall means being greater than the distance between said trailing edges along said second rhomboidal side wall means, said first and second rhomboidal side wall means and said first cutting face converging at said first cutting end portion and said first and second side wall means and said second cutting face converging at said second cutting end portion, a plane extending substantially intermediate said first and second substantially rhomboidal side wall means constituting a longitudinal reference plane, each said first and second cutting face lying in non-parallel planes which non-parallel planes are other than normal to said reference plane.

3. A double-ended bit comprising a solid piece of metal having first and second substantially rhomboidal side wall means, first and second leading edges, and first and second trailing edges, said first leading and trailing edges defining a first skew cutting face terminating in a first cutting point, said second leading and trailing edges defining a second skew cutting face terminating in a second cutting point, said first substantially rhomboidal side wall means extending between said first and second leading edges and said second substantially rhomboidal side wall means extending between said first and second trailing edges the distance between said leading edges along said first rhomboidal side wall means being greater than the distance between said trailing edges along said second rhomboidal side wall means, said first and second rhomboidal side wall means and said first cutting face converging at said first cutting point and said first and second side wall means and said second cutting face converging at said second cutting point, a plane extending substantially intermediate said first and second substantially rhomboidal side wall means constituting a longitudinal reference plane, each said first and second cutting face lying in a plane different from a plane which is normal to said reference plane.

4. A double-ended bit comprising a solid piece of metal having first and second side wall means, first and second leading edges, and first and second trailing edges, said first leading and trailing edges defining a first cutting face terminating in a first cutting end portion, said second leading and trailing edges defining a second cutting face terminating in a second cutting end portion, said first side wall means extending between said first and second leading edges and said second side wall means extending between said first and second trailing edges, the distance between said leading edges along said first side wall means being greater than the distance between said trailing edges along said second side wall means, said first and second side wall means and said first cutting face converging at said first cutting end portion and said first and second side wall means and said second cutting face converging at said second cutting end portion, a plane extending substantially intermediate said first and second side wall means constituting a longitudinal reference plane, each said first and second cutting face lying in a plane different from a plane which is normal to said reference plane.

5. A double-ended bit comprising a piece of metal having first and second side wall means, first and second leading edges, and first and second trailing edges, said first leading and trailing edges defining the sides of a first cutting face, said second leading and trailing edges defining the sides of a second cutting face, said first side wall means extending between said first and second leading edges and said second side wall means extending between said first and second trailing edges, a plane extending substantially intermediate said first and second side wall means constituting a longitudinal reference plane, each said first and second cutting face lying in planes different from planes which are normal to said reference plane.

6. A coal cutting bit having a cutting tip portion defined by first and second side wall means and a cutting face, said first and second side wall means and said cutting face forming substantially a pyramid terminating in an apex, said pyramid having a generally triangular shaped cross section at a spaced distance from said apex, said first and second side wall means meeting at a connecting edge portion, said connecting edge portion lying in a reference plane which extends intermediate said first and second side wall means, said cutting face lying in a plane other than a plane which is normal to said reference plane.

7. A coal cutting bit adapted to travel in a continuous cutting path including a skew cutting face and first and second side wall means, said skew cutting face terminating in a cutting point, said cutting face having first and second side surface portions, said first side wall means meeting said first side surface portion thereby defining a leading edge and said second side wall means meeting said second side surface portion thereby defining a trailing edge, said first and second side wall means and said skew cutting face converging at said cutting point, said first and second side wall means meeting at a connecting edge portion, said connecting edge portion lying in a reference plane which extends intermediate said first and second side wall means, said skew cutting face lying in a plane different from a plane which is normal to said reference plane, said leading edge of said coal cutting bit being in advance of said trailing edge when said bit travels in said continuous cutting path thereby preceding said trailing edge in engaging coal to be cut.

8. A coal cutting bit including a cutting face and first and second side wall means, said cutting face terminating in an end portion, said first side wall means meeting said cutting face thereby defining a leading edge and said second side wall means meeting said cutting face thereby defining a trailing edge, said first and second side wall means and said cutting face meeting at said end portion, a plane extending intermediate said first and second side wall means constituting a reference plane, said cutting face lying in a plane different from a plane which is normal to said reference plane.

References Cited in the file of this patent
UNITED STATES PATENTS
2,657,916　　Von Stroh _____ Nov. 3, 1953